Jan. 10, 1961   M. R. FENSKE ET AL   2,967,878
VAPOR PHASE CATALYTIC CONVERSION PROCESSES
Filed March 31, 1958
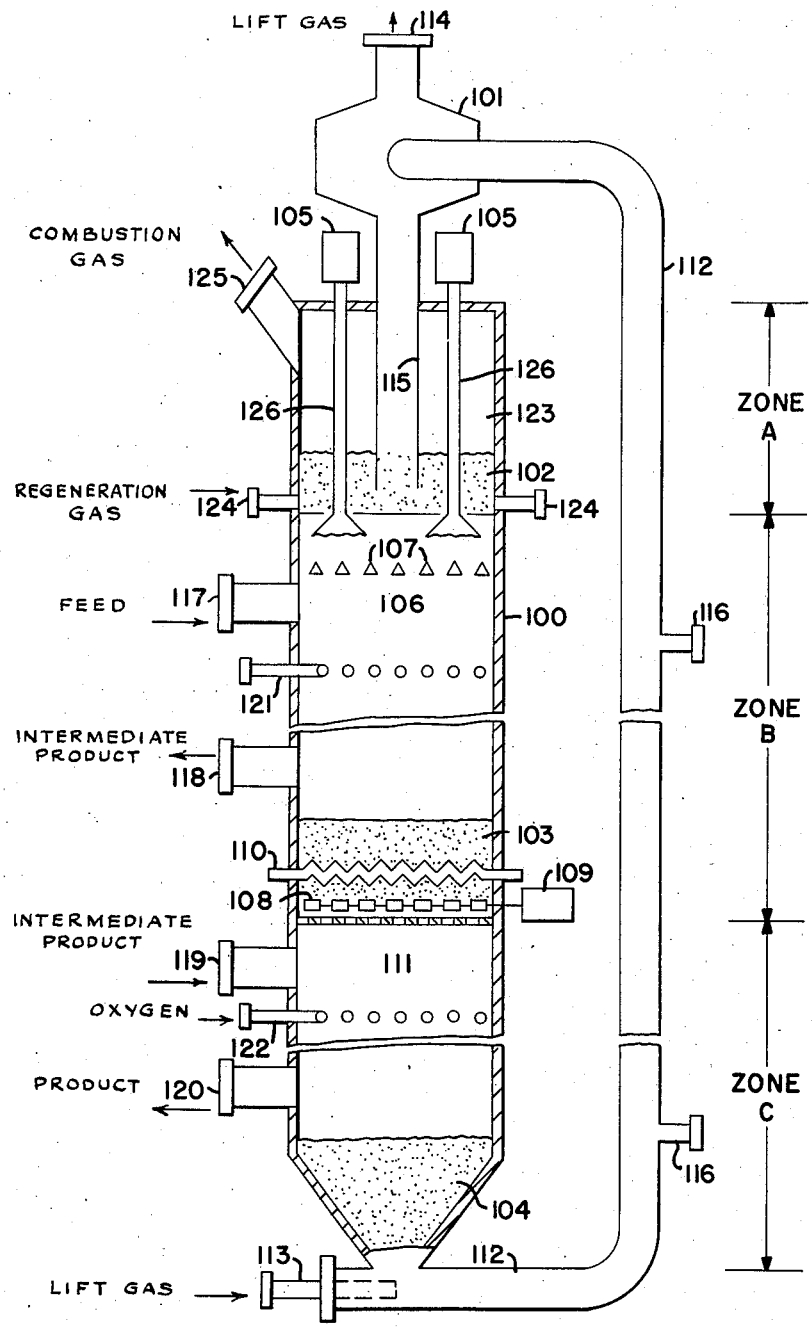
Merrell R. Fenske
Jennings H. Jones   Inventors
By Seymour Stahl Attorney

United States Patent Office

2,967,878
Patented Jan. 10, 1961

2,967,878

VAPOR PHASE CATALYTIC CONVERSION PROCESSES

Merrell R. Fenske and Jennings H. Jones, State College, Pa., assignors to Esso Research and Engineering Company, a corporation of Delaware Filed Mar. 31, 1958, Ser. No. 725,157

15 Claims. (Cl. 260—451)

This invention is concerned with a novel combination involving vapor phase catalytic reaction and vapor phase essentially noncatalytic reaction employing the catalyst from the catalytic reaction as essentially inert heat transfer solids in the non-catalytic reaction.

More particularly, this invention relates to the conversion of hydrocarbons to unsaturated hydrocarbons of lower molecular weight in an upper zone of a reaction vessel in contact with finely divided catalytic raining solids through the upper zone in essentially free fall condition, and the partial oxidation of the reaction products from said upper zone in a lower zone in contact with finely divided solids obtained from said upper zone wherein the finely divided solids are employed to modify or control the temperatures within the lower zone. Although the catalyst from the upper zone is employed in the lower zone as heat transfer solids, the lower zone reaction is essentially non-catalytic.

In accordance with one embodiment of this invention, the reaction in the upper zone is endothermic, e.g. catalytic cracking, and the reaction in the lower zone is exothermic, e.g. partial oxidation; however, it is to be understood that this invention is amenable to carrying out endothermic or exothermic reactions in both zones as well as exothermic reaction in the upper zone and an endothermic reaction in the lower zone. In general, the reaction conditions, i.e. temperature and pressure, may be the same in both zones, however, when employing a combination of catalytic cracking and partial oxidation reactions, the upper zone temperatures will be significantly higher than the lower zone temperatures.

It is also within the purview of this invention to collect the catalytic particles from the upper zone and to modify the temperatures of these solids to permit the maintenance of the proper temperatures in the lower zone as dictated by the particular reaction carried out therein.

By the term "raining solids," it is meant that solids in a finely divided state and susceptible to fluidization are allowed to pass through the reaction zones in essentially free fall condition modified by the rising or descending vapors within the reaction zone. It is not meant to exclude the use of baffles, screens, or the like to evenly distribute the solids. The solids employed may be any conventional type of catalyst for the particular reaction desired and preferably will have an average particle diameter of between 50 to 1000 microns. It is preferred to maintain sufficient solids in the reaction to effect a true catalytic reaction. This may vary from 1–500 pounds of catalyst per 100 pounds of vapor. The solids density in the upper zone may be the same, higher or lower than the solids density in the lower zone.

In general, the process of this invention will comprise passing the reactant gases into an upper zone maintaining within said zone reaction conditions, i.e. temperature and pressure, contacting the reaction vapors with the desired specific raining solids catalyst and withdrawing the reaction product gases from this upper zone. The raining solids are preferably collected at the bottom of the upper zone and wherein they may be modified in temperature, if necessary. For example, the solids collected from the bottom of the upper reaction zone may be heated or cooled depending on the dictates of the reaction which takes place in the lower zone. The reaction product from the upper zone is then passed into the lower zone for an essentially noncatalytic conversion process such as partial oxidation which requires the addition of extraneous oxygen containing gases in contact with the temperature modified solids from the upper zone which are now made to rain down or descend in essentially free fall condition through the lower zone to maintain the appropriate reaction temperature conditions.

The gaseous reaction product from the lower zone is recovered and the solids recycled to the upper portion of the reaction vessel. Obviously, if the catalytic particles require regeneration, this may be carried out by a number of obvious techniques including burning in the presence of oxygen or other regeneration techniques known in the art which will depend on the particular catalyst and catalytic conversion process which is to be undergone in the upper zone. In a preferred embodiment the catalyst is regenerated at the top of the reactor after it is transported thereby a conventional riser pipe employing inert carrier gases.

In a preferred mode of operation the reaction vessel to be described in detail subsequently comprises at least three zones, zone A or the uppermost zone will contain the catalytic particles recycled from the lower zone and preferably in a fluidized condition. Concomitantly as the catalytic particles are rained downwardly through zone B, i.e. the upper reaction zone, hydrocarbon vapors are passed in contact with said raining catalytic solids either cocurrently or countercurrently at temperatures sufficient to crack the hydrocarbons to produce olefinic unsaturated compounds of lower molecular weight. If desired, small amounts of oxygen which may be utilized to speed up the catalytic cracking reaction are admitted into the upper zone. As previously noted, the hydrocarbon feed may be passed through the upper reaction zone cocurrently with the raining catalytic solids. In any event, the reaction product from the upper zone which will be cracked hydrocarbons are withdrawn therefrom and the catalytic raining solids are accumulated in the lower portion of the upper reaction zone. As an example, catalytic cracking may be carried out at about 1050° F. and 0–200 p.s.i.g. The accumulation of catalytic solids in the lower portion of the upper reaction zone is then preferably heat exchanged to reduce the temperature of the solids to about 500 to 700° F. or a temperature suitable for partial oxidation. The temperature modified solids are then passed downwardly through the lower reaction zone concomitant with the introduction of the cracked product from the upper zone and sufficient oxygen, e.g. .1 to 1 mole per mole of gas, to effect partial oxidation of the cracked feed to valuable chemical products.

In this lower reaction zone the solids are essentially inert to the partial oxidation reaction and act principally as a heat control media. It is known, for example, that high surface contact will quench a partial oxidation reaction or effect the production of carbon dioxide and water and it is therefore necessary to rain the solids downwardly through the lower zone in a relatively dispersed fashion, e.g. 1 to 100 pounds solids per 100 pounds of reactant vapors. As in the upper zone, the cracked hydrocarbon vapors may be made to pass cocurrently or counter-currently with the falling solids. The partially oxidized product is then recovered from the lower reaction zone and the solids recycled to perform as catalyst for the catalytic conversion of hydrocarbons in the upper zone. As previously noted, the catalyst may require regeneration and this may be accomplished by any one of the known techniques.

To illustrate the invention with more particularity, reference may be had to the drawing wherein the sole figure shows a reactor design amenable to either cocurrent or countercurrent reactions as noted above and to any combination of exo and/or endothermic reactions which may be desired. It is also to be understood that although two primary reaction zones are shown, added zones may be employed to fit the needs of a particular reaction. The figure depicts a reactor using the raining solids flow technique to carry out a succession, or sequence, of reactions in a series of zones.

Reactor 100 is a vertical cylindrical shell. It is fitted at the top with cyclone 101, and is divided into the three zones A, B and C. In this reactor are three dense phase beds of fluidized solids 102, 103 and 104. The solids are preferably catalytic and selected to cause specific chemical transformations in the reacting vapors under proper conditions of temperature and pressure. For example, when the reacting vapors are high molecular weight hydrocarbons boiling in the range above about 500° F., and when it is desired to convert these hydrocarbons into lower boiling, high octane, gasoline components and low boiling oxy compounds suitable for fuels, the flowing solids may be aluminum or magnesium silicates, chromia on alumina, silica-alumina or any other well-known catalytic compositions selected to speed up the desired reaction.

Valves 126 and 126' are vertically acting, and control the flow of solids out of bed 102 into reaction space 106, or zone B. These valves may be operated by hydraulic or pneumatic cylinders 105. The solids from bed 102 are dispersed by the serrated cone-shaped bottoms on valves 126. The solids are further dispersed across reaction zone 106 by grids 107. Additional grids 107 may be positioned in zone B to disperse further the raining solids, and to interrupt their free fall so as to provide a longer residence time of the solids in zone B.

The solids falling downward through reaction space 106 collect above slide valve 108 as a dense fluid bed 103. This slide valve may be operated by a hydraulic or pneumatic mechanism 109. Bed 103 can be cooled or heated by heat transfer coil 110.

After passing through slide valve 108, the solids flow into reaction space 111 and zone C. Reaction space 111 may also contain baffles or grids 107 to enhance the dispersal of the falling solids and slow down their rate of fall in zone C. These solids then collect as a dense bed 104 in the lower part of zone C. This bed may also be provided with heating and cooling means, not shown. Jet 113 propels or lifts these solids through line 112 upward to cyclone 101 where they are disengaged from the lift gas. These gases exist via line 114 to be led to a recovery or condensing system. The solids flow down through pipe 115, and then into dense bed 102 to be recycled again through zone B and C.

The gas used in jet 113 to propel the solids through line 112 may be steam, hydrogen, low molecular weight fuels such as methane, or inerts, such as nitrogen.

If desired, additional fluid may be added via pipes 116. Thus, if solids cooling is desired, this may be a water or steam spray. If heating of the solids is desired, then the fluid entering jet 113 may be in part a combustible gas, and air or oxygen may be added via pipes 116 so that some burning takes place in line 112.

Line 112 may also serve as a stripping device to strip or remove adsorbed materials from the solids.

The material to be converted, or the feed for reactor 100, enters in essentially vaporous form through opening 117 into reaction space 106, or zone B. The products leave via opening 118. Alternatively the gases may be fed into 118 and exit through 117. From here they may be led directly into reaction space 111, or zone C through opening 119 or 120. Or they may be cooled or heated before entering zone C. The products from zone C, or reaction space 111, leave via opening 120. From here these products pass to a recovery system for further separation or processing.

For purposes of illustration, the material fed into reaction space 106, via opening 117, normally is a gas oil, or petroleum fraction boiling above about 700° F. at atmospheric pressure. However, lighter fractions such as light naphthas or catalytic naphthas also are potential feedstocks. The solids circulating through reaction zone 100 is an aluminum silicate cracking catalyst in particulate, or fluidizable, form.

The products, or cracked hydrocarbons boiling in the gasoline range, leave via 118. Some air or oxygen may be introduced into reaction space 106 via line 121, e.g. up to about 25 wt. percent based on feed. This oxygen is consumed to a substantial degree in reaction space 106 to provide at least part of the reaction heat, and to accelerate the cracking reaction by producing free radicals.

The products leaving 118 are then introduced into reaction space 111, or zone C, via opening 119. Here these products are partially oxidized in the vapor phase to produce oxy compounds valuable as fuel components or chemicals. To produce this oxidation in reaction zone 111, air, oxygen, or enriched air is introduced via several lines 122 positioned in reactor 111.

The solids raining down through reaction space 111 now serve as essentially noncatalytic heat adsorbers. They control the oxidation reaction to make it selective to producing oxygenated organic compounds and not oxides of carbon.

The reason the particulate flowing solids do not exercise as much catalytic activity in reaction space 111, as in space 106 is due to the extremely fast rate of the oxidation reaction which is predominate in space 111. In space 106 the degree of oxygen attack is much more limited because the supply of oxygen is either nil or small compared to that employed in space 111.

If there is a deposition of carbon or other materials on the downward flowing particulate solids while they are in zones B and C, that impair their catalytic effectiveness, these materials may be burned off, or otherwise destroyed, in zone A, or reaction space 123. Air or gas containing oxygen is introduced into bed 102 via nozzles or pipes 124 to fluidize the bed and burn off harmful deposits. The products from this combustion flow out via opening 125, usually to be lead to a stack.

Reactor 100 operates usually at temperatures between about 600° and 1000° F., and pressures up to about 100 p.s.i., although higher pressures may be employed.

The following examples recite procedures for converting various hydrocarbons or hydrocarbon fractions such as a gas oil, a kerosene, a heating oil, or a petrolatum to more useful products such as chemicals or/and a gasoline fraction by conducting the process at more than one processing condition such as at two different temperature levels, for example.

EXAMPLE 1

A quantity totaling 100 pounds of a gas oil (API gravity=35.4; D1160 distillation: I.B.P.=357° F., 50%= 607° F., 95% and final B.P.=668° F.) was fed to zone B of the reactor shown in the drawing together with 24 pounds of oxygen, equally distributed to this reaction zone B at multiple inlets 121 spaced along the length of reaction zone B. The average reaction temperature was about 545° C. (1010° F.), the pressure was atmospheric, and the contact or reaction time was about 5 seconds. The solids flowing in reaction zone B amounted to about 5 to 10 pounds per gram mole of oxygen. The oxygen was completely consumed and 86% of the gas oil underwent conversion. A sample of the product was removed at outlet 118 and on analysis was found to be composed of the following:

*Products formed in zone B of reactor 100*

| Product | Wt., Pounds |
|---|---|
| Unconverted Gas Oil | 14 |
| Oxygenated Compounds Boiling Above 80° C. and Composed Largely of Epoxides | 27 |
| $C_2$ to $C_4$ Olefins | 21 |
| $C_5$ to $C_{20}$ Olefins | 25 |
| Methane + a Trace of Higher Paraffins | 6 |
| CO | 2 |
| $CO_2$ | 10 |
| Water of Reaction | 19 |
| | 124 |

The product from the above reaction then passed directly into the second reaction zone C where the reaction temperature was maintained at about 350° C. (660° F.). In this reaction zone C an additional 32 pounds of oxygen was added at multiple inlets 122 equally distributed over the length of reaction zone C; the contact time was again about 5 seconds, and the pressure was substantially atmospheric. The final products removed via opening 120 was composed of the following, after hydrogenating the aqueous layer product.

*Products from the two-zone oxidation treatment*

| Product | Wt., Pounds |
|---|---|
| Water Soluble Oxygenated Materials, Largely methyl alcohol but containing some $C_2$ and $C_3$ alcohols and some $C_5$ and $C_6$ epoxides | 19 |
| $C_6$ and $C_7$ epoxides plus some other oxygenated compounds | 4 |
| High epoxides and some unreacted gas oil | 30 |
| $C_2$ to $C_4$ olefins | 27 |
| $C_5+$ olefins | 8 |
| Methane | 8 |
| CO | 9 |
| $CO_2$ | 12 |
| Water of Reaction | 39 |
| | 156 |

The above process gave, on a basis of 100 pounds of feedstock, 32 pounds of an oxygenated gasoline fraction (research octane number with 3 ml. per gallon of tetraethyl lead=100), 27 pounds of $C_2$ to $C_4$ olefins, and 34 pounds of material boiling above the gasoline range consisting of about 80% of oxygenated material rich in epoxides.

The gasoline fraction consisted largely of water soluble oxygenated compounds rich in $C_1$, $C_2$ and $C_3$ alcohols. The $C_2$ to $C_4$ olefin portion could be polymerized or alkylated to yield additional gasoline-range product, or it could be used for conversion to other chemicals. The material boiling above the gasoline range, and which was also rich in oxygenated material could be recycled to reactor 100 for further treatment, or it may be used for blending with heating oil to yield an improved product having better burning qualities.

In the absence of oxygen less than 20% of the gas oil underwent thermal cracking when passed through zones B and C of the above reactor under similar conditions. Thus the oxygen behaved much like a homogeneous cracking catalyst. Further, to obtain an equivalent proportion of cracking (i.e., about 90%) in the absence of oxygen, it would be necessary to raise the reaction temperature by at least 300° F. Under such drastic conditions 20 to 30% of the gas oil would be converted to heavy tars and cycle oils. No such heavy ends are formed by the oxidation process.

EXAMPLE 2

A kerosene on treatment according to Example 1 gave a similar distribution of products.

EXAMPLE 3

A heating oil on treatment according to Example 1 gave similar products.

EXAMPLE 4

A quantity totaling 100 pounds of a light Arabian naphtha (gravity=71.9° API; aniline point=140° F.; bromine No.=0; ASTM distillation, 5%=162° F., 50%=173° F., 95%=203° F.; chromatographic analysis: 75% paraffins, 23% naphthenes, and 2% aromatics) was fed to zone B together with 18 pounds of oxygen. The pressure was substantially atmospheric, the temperature was about 565° C. (1050° F.), the solids used were zircon silicate 300 microns in size, and the amount of solids flowing was about 7 pounds per gram mole of oxygen used.

The products from zone B then were led to zone C to which an additional 13 pounds of oxygen was added. The temperature in zone C was maintained at 365° C. (690° F.); all other conditions were the same as in zone B.

The final products isolated as a result of the above process are tabulated below together with the composition of the products issuing from zone B.

| | Basis: 100 Pounds of Naphtha Feed. Products, in Pounds | |
|---|---|---|
| | At Outlet of Zone B | At Outlet of Zone C |
| Gasoline Range Products: | | |
| Olefins | 18 | 18 |
| Oxygenated | 7 | 18 |
| Unreacted Feed | 52 | 44 |
| $C_2$ and $C_3$ olefins | 9 | 10 |
| $C_4$ olefins | 8 | 10 |
| CO | 5 | 7 |
| $CO_2$ | 7 | 8 |
| $CH_4$ | 3 | 4 |
| Water of Reaction | 9 | 12 |
| | 118 | 131 |
| Octane No. of Gasoline Range Products: | | |
| Research + 3 ml. TEL/gal.= | 87.0 | 100 |
| Motor + 3 ml. TEL/gal.= | 83.8 | 85 |
| Octane No. of Feed to Zone B: | | |
| Research + 3 ml. TEL/gal.= | 80.5 | |
| Motor + 3 ml. TEL/gal.= | 78.8 | |

EXAMPLE 5

A hydroformate (from a 200° to 400° F. Arabian naphtha, containing 61% aromatics, 9% naphthenes, and 30% paraffins; specific gravity=0.794; bromine No.= 6.2; aniline point=24° F.) was fed to zone B of the reactor. The temperature was 535° C. (995° F.), the pressure was substantially atmospheric, and the solids (zircon silicate) were flowing at a rate of 10 pounds per gram mole of oxygen. A total of 7 pounds of oxygen also was fed to zone B. The contact time was about 4 seconds.

The products then passed into zone C where all conditions were similar to those of zone B except that the temperature was 380° C. (720° F.). An additional quantity of oxygen (25 pounds) was added to zone C.

The final products resulting from the above treatment are tabulated below with the composition of the products issuing from zone B.

| | Feed | Basis: 100 Pounds of Hydroformate Feed. Products, in Pounds | |
|---|---|---|---|
| | | At Outlet of Zone B | At Outlet of Zone C |
| Gasoline Range Products: | | | |
| Olefins | 0 | 11 | 10 |
| Oxygenated | 0 | 3 | 25 |
| Other hydrocarbons | 100 | 78 | 55 |
| $C_2$ and $C_3$ olefins | | 3 | 4 |
| $C_4$ olefin | | 2 | 2 |
| $CH_4$ | | 1 | 1 |
| CO | | 2 | 8 |
| $CO_2$ | | 4 | 7 |
| Water of Reaction | | 3 | 20 |
| | 100 | 107 | 132 |
| Octane No. of Gasoline Range Products: | | | |
| Research + 3 ml. TEL/gal | 99.3 | 103 | 105 |
| Motor + 3ml. TEL/gal | 90.0 | 91 | 94 |

EXAMPLE 6

A quantity totaling 100 pounds of the same gas oil used in Example 1 was fed to the initial reaction zone B as before, together with 12 pounds of oxygen, distributed to reaction zone B by means of multiple inlets 121. The average reaction temperature was 1010° F., the contact time was about 5 seconds, the pressure was substantially atmospheric, and the flowing solids used consisted of a silica-alumina-zirconia cracking catalyst in the form of 300 micron size particles. The solids flowing in reactor 100 amounted to about 20 to 40 pounds per gram mole of oxygen. The oxygen was added not only to produce some oxygenated materials, but also to supply heat for the cracking reaction.

The products from reaction zone B then passed into secondary reaction zone C where the conditions were the same except that the reaction temperature was maintained at about 350° C. (660° F.) To this second zone C an additional amount of oxygen totaling 34 pounds was added via lines 122 at multiple points distributed throughout reaction zone C.

The various products obtained from the overall reaction in zones B and C as well as those present at the outlet of zone B are tabulated below. The aqueous layer product was hydrogenated to convert all aldehydes to alcohols.

| | Basis: 100 Pounds of Gas Oil. Products, in Pounds | |
|---|---|---|
| | At Outlet of Zone B | At Outlet of Zone C |
| Unconverted Gas Oil | | 10 |
| Heating Oil Plus Some Heavier Material | 42 | 15 |
| Oxygenated Products: | | |
| Water Soluble Alcohols, etc. | 2 | 15 |
| Epoxides Boiling Above 200° C | 12 | 20 |
| Epoxides Boiling Below 200° C | | 4 |
| Olefin: | | |
| $C_2$ to $C_4$ | 11 | 16 |
| $C_5+$ | 21 | ¹16 |
| Hydrocarbons, Liquid in Gasoline Range: | | |
| Paraffins $C_5+$ | 4 | 4 |
| Naphthenes | 3 | 2 |
| Aromatics | 3 | 2 |
| $CH_4$ | 3 | 5 |
| CO | 1 | 7 |
| $CO_2$ | 5 | 7 |
| Water of Reaction | 5 | 14 |
| | 112 | 137 |

¹ 11 pounds in gasoline range; the remainder above gasoline range.

On a basis of 100 pounds of the gas oil feed, 39 pounds of the above products consisted of a gasoline fraction composed of about 40 percent of oxygenated compounds. This gasoline had a research octane number when containing 3 ml. of lead tetraethyl per gallon of 95 to 102. In addition to the gasoline fraction, 16 pounds of $C_2$ to $C_4$ olefins, suitable for polymerization or alkylation to comprise additional supply of gasoline or useful as chemicals, and about 50 pounds of material boiling above the gasoline range was produced. The latter material was rich in epoxides (more than 50% by weight). It is suitable for recycling to reation zones B or C, or as a clean-burning heating oil or diesel fuel.

The overall reaction was characterized by the clean products formed. Essentially no cycle stock (normally formed in catalytic cracking reactions) was produced, and only a very small amount of coke resulted.

EXAMPLE 7

A quantity totaling 100 pounds of a petrolatum (gravity, degrees API=36.2; distillation at 10 mm., degrees F., I.B.P.=528; 5%=566; 50%=602; 71%=620; ASTM pet. M.P.=140.5° F.) was fed to zone B of reactor 100 together with 8 pounds of oxygen introduced via line 121. About 1 pound of water in the form of steam was introduced with each 10 pounds of petrolatum to insure complete vaporazation of the latter. The temperature was 1020° F., the contact time was about 6 seconds, the pressure was essentially one atmosphere, and the solids flowing were 300 micron size zircon silicate, which are essentially inert. The proportion of solids used was about 7 to 10 pounds per gram mole of oxygen (100 to 140 pounds per pound of oxygen).

The reaction products then passed into reaction zone C together with an additional quantity (31 pounds) of oxygen, added at multiple points 122 in reaction zone C in such a manner that the concentration of oxygen at any one point was relatively small. The temperature in this zone C was maintained at about 350° to 400° C., the contact time was about 5 to 6 seconds, the pressure was atmospheric and the solids rate was the same as that used in zone B.

The products resulting from this process, including those present at the end of reaction zone B, are tabulated below:

| | Basis: 100 pounds of Petrolatum Products, in Pounds | |
|---|---|---|
| | At Outlet of Zone B | At Outlet of Zone C |
| Olefins: | | |
| $C_2$ to $C_4$ | 22 | 29 |
| $C_5$ and higher | 46 | 11 |
| Oxygenated Material: | | |
| Water soluble, largely $C_1$-$C_3$ alcohols | | 20 |
| Epoxides in gasoline range | 10 | 7 |
| Higher Epoxides | | 30 |
| Unreacted Feedstock | 19 | 5 |
| $CH_4$ | 4 | 6 |
| CO | 2 | 8 |
| $CO_2$ | 1 | 3 |
| Water of Reaction | 4 | 20 |
| | 109 | 139 |

On a basis of 100 pounds of the petrolatum feedstock, 31 pounds of gasoline range product was obtained, together with 29 pounds of $C_2$ to $C_4$ olefins, and 42 pounds of higher boiling products rich in epoxides. The gasoline fraction had a research octane number when containing 3.0 ml. of lead tetraethyl per gallon of 95 to 103 and contained about 80% of oxygenated material. The higher boiling epoxide fraction may be recycled for further processing, or may be further finished to give an improved heating oil or jet or diesel fuel. The latter material is clean and contains no cycle oil or resins, which are characteristic of conventional catalytic cracking processes.

When the same petrolatum was passed through zones B and C of the above reactor under similar conditions except in the absence of oxygen, less than 40% of the petrolatum underwent thermal cracking. In order to obtain comparable conversions of the petrolatum by thermal or steam cracking processes much higher temperatures would be necessary and under such conditions coke and tar would be formed. No coke is formed during the oxidation process and all products are clean.

Instead of the solids and vapors flowing cocurrently as just described, they may flow countercurrently. For instance, in connection with Example 6, the vapors to be processed may first flow into zone V via opening 120 and countercurrent to the descending dispersed stream of particulate solids to leave reaction zone 111 via opening 119. They may be led directly into zone B via opening 118, or be first heated or cooled. After entering 118 they flow again upward and countercurrently to the descending dispersed particulate solid stream in reaction zone 106. The products leave via opening 117. From 117 the vapors flow to a recovery unit where they may be condensed and separated into a gasoline component stream, containing oxy compounds, and a recycle or fuel oil stream.

The reactor in the drawing is a versatile unit. It may be used advantageously as a catalytic cracking apparatus with little or no oxygen added to the reacting vapors.

The utilization of cracking catalyst in this dispersed form has several advantages over the dense fluid bed catalytic cracking apparatus commonly in use. First, there is much more uniform contacting of hydrocarbon vapors and catalyst. There is much less by-passing of vapors and no recycling of catalyst in the cracking zone. There are no voids or holes in the catalyst beds to contend with and overcracking is much less. Second, the catalyst stripping operation in zone C is much more effective because of the greatly improved contacting of the raining catalyst with the stripping gas. Third, countercurrent contacting of raining catalyst and vapors can be employed as readily as cocurrent contacting. For example, the gas oil vapors to be cracked into gasoline can be introduced through opening 118 to flow upward in reaction space 106 and countercurrent to the cloud of descending particulate catalyst. The products leave via opening 117. Thus there is much more flexibility of operation. Fourth, some air, or oxygen-containing gas, can be introduced via line 121 into the cracking zone 106 to accelerate the cracking reaction by forming free radicals. This is also a suitable means for supplying the required heat for the endothermic cracking reaction. It is not possible to add oxygen effectively to dense fluidized bed reactors containing inert solids because the dense beds stop or inhibit the oxidation reaction. When oxidation does occur in holes, or voids, or pockets in the dense fluidized beds, the oxidation usually only produces oxides of carbon and water. Few free radicals are produced in this way. Free radicals in the vapor phase have a pronounced effect on accelerating the cracking reaction.

Even if a fixed bed type of catalytic cracking operation is employed, the addition of oxygen to this type of process results primarily in a burning on the surface of the cracking catalyst to produce oxides of carbon and not useful oxy compounds or olefins.

What is claimed is:

1. A catalytic conversion process which comprises contacting in an upper zone a hydrocarbon vapor feed with finely divided catalyst particles in essentially free fall condition whereby said hydrocarbon feed is cracked to produce unsaturated compounds of lower molecular weight than said feed, withdrawing cracked product from said upper reaction zone and accumulating said finely divided solids, cooling said accumulated finely divided solids, passing cracked product into a lower reaction zone in contact with said cooled finely divided solids and an oxygen-containing gas, said solids being distributed downwardly through said lower reaction zone in essentially free fall condition and in an amount sufficient to aid in controlling the temperature in said lower reaction zone and recovering valuable oxygenated products from said lower zone.

2. A process in accordance with claim 1 wherein said gases in both reaction zones are passed countercurrent to the falling solids.

3. A process in accordance with claim 1 wherein said gases in both reaction zones are passed cocurrent to the falling solids.

4. A process in accordance with claim 1 wherein the feed to at least one of said reaction zones is passed countercurrently to the falling solids.

5. A process in accordance with claim 1 wherein the feed to at least one of said reaction zones is passed cocurrently to the falling solids.

6. A process for converting a hydrocarbon feed to less saturated lower molecular weight hydrocarbons and oxygenated hydrocarbons which comprises reacting in an upper zone said hydrocarbon feed in vaporous form at elevated temperatures in the presence of finely divided catalytic solids and small amounts of an oxygen-containing gas, said solids being present in essentially free fall condition, withdrawing reaction product from said upper zone and accumulating said finely divided solids in a lower portion of said upper zone, passing said reaction product into a lower zone in contact with an oxygen-containing gas under partial oxidation conditions, cooling said finely divided solids and passing said finely divided solids in essentially free fall condition through said lower reaction zone in an amount sufficient to aid in controlling the temperature within said lower reaction zone and recovering a product containing unsaturates and oxygenated hydrocarbons.

7. A process in accordance with claim 6 wherein said gases in both reaction zones are passed countercurrent to the falling solids.

8. A process in accordance with claim 6 wherein said gases in both reaction zones are passed cocurrent to the falling solids.

9. A process in accordance with claim 6 wherein the feed to at least one of said reaction zones is passed countercurrently to the falling solids.

10. A process in accordance with claim 6 wherein the feed to at least one of said reaction zones is passed cocurrently to the falling solids.

11. A process in accordance with claim 6 wherein the finely divided solids from said lower reaction zone are recovered and recycled to said upper reaction zone.

12. A catalytic conversion process which comprises contacting in an upper zone a hydrocarbon vapor feed with finely divided catalyst particles in essentially free fall condition and an oxygen-containing gas, whereby said hydrocarbon feed is cracked to produce unsaturated compounds of lower molecular weight, withdrawing cracked product from said upper reaction zone and accumulating said finely divided solids in a lower portion of said upper zone, cooling said accumulated finely divided solids, passing cracked product from said upper zone into a lower reaction zone in contact with said cooled finely divided solids and an oxygen-containing gas, distributing said solids downwardly through said lower reaction zone in essentially free fall condition and in an amount sufficient to aid in controlling the temperature in said lower reaction zone, recovering valuable oxygenated products from said lower zone, reheating said solids accumulated from said lower reaction zone, regenerating and recycling said regenerated solids to said upper reaction zone.

13. In a process in accordance with claim 12 wherein said solids are maintained in said upper reaction zone in an amount sufficient to effect a catalytic reaction.

14. A chemical process which comprises reacting in an upper reaction zone gaseous feed at elevated temperatures in the presence of finely divided catalytic solids, said solids being present in essentially free fall condition, withdrawing from said upper reaction zone an upper zone reaction product and accumulating said finely divided solids, introducing said upper zone reaction product into a lower reaction zone, passing such accumulated finely divided solids downwardly in essentially free fall condition through said lower reaction zone in the presence of said upper zone reaction product, reacting said upper zone reaction product in said lower reaction zone, said finely divided solids being present in an amount sufficient to aid in controlling the temperature within said lower reaction zone, and recovering product from said lower reaction zone.

15. A chemical process which comprises reacting in an upper reaction zone gaseous feed at elevated temperatures in the presence of finely divided catalytic solids, said solids being present in essentially free fall condition, withdrawing from said upper reaction zone an upper zone reaction product and accumulating said finely divided solids in a lower portion of said upper reaction zone, modifying the temperature of such accumulated solids, introducing said reaction product and oxygen into a lower reaction zone, passing such accumulated finely divided solids downwardly in essentially free fall condition through said lower reaction zone, reacting said upper zone reaction product and said oxygen in said lower reaction zone, said finely divided solids being present in an amount sufficient to aid in controlling the temperature within said lower reaction zone, and recovering product from said lower reaction zone.

References Cited in the file of this patent

UNITED STATES PATENTS

| | | |
|---|---|---|
| 2,587,703 | Deanesly | Mar. 4, 1952 |
| 2,793,987 | Brown et al. | May 28, 1957 |

FOREIGN PATENTS

| | | |
|---|---|---|
| 763,675 | Great Britain | Dec. 12, 1956 |
| 772,680 | Great Britain | Apr. 17, 1957 |